(12) United States Patent
Hao et al.

(10) Patent No.: US 10,233,031 B2
(45) Date of Patent: Mar. 19, 2019

(54) DISPLAY PANEL TURNOVER DEVICE AND METHOD FOR USING THE SAME

(71) Applicants: BOE TECHNOLOGY GROUP CO., LTD., Beijing (CN); HEFEI BOE DISPLAY TECHNOLOGY CO., LTD., Anhui (CN)

(72) Inventors: Xikui Hao, Beijing (CN); Zhiyu Qian, Beijing (CN); Yong Sun, Beijing (CN); Fangqing Li, Beijing (CN); Wei Min, Beijing (CN); Anlong Xu, Beijing (CN)

(73) Assignees: BOE TECHNOLOGY GROUP CO., LTD., Beijing (CN); HEFEI BOE DISPLAY TECHNOLOGY CO., LTD., Anhui (CN)

( * ) Notice: Subject to any disclaimer, the term of this patent is extended or adjusted under 35 U.S.C. 154(b) by 0 days.

(21) Appl. No.: 15/674,255

(22) Filed: Aug. 10, 2017

(65) Prior Publication Data

US 2018/0057273 A1 Mar. 1, 2018

(30) Foreign Application Priority Data

Aug. 26, 2016 (CN) .......................... 2016 1 0741865

(51) Int. Cl.
| | | |
|---|---|---|
| *F25C 5/00* | (2018.01) | |
| *B65G 47/248* | (2006.01) | |
| *B28D 7/04* | (2006.01) | |
| *G09F 9/35* | (2006.01) | |
| *G09F 7/18* | (2006.01) | |
| *G02F 1/13* | (2006.01) | |

(52) U.S. Cl.
CPC ........... *B65G 47/248* (2013.01); *B28D 7/043* (2013.01); *G02F 1/1303* (2013.01); *G09F 7/18* (2013.01); *G09F 9/35* (2013.01)

(58) Field of Classification Search
CPC . B65G 47/248; G02F 1/13; G09F 7/18; G09F 9/35
USPC ....... 198/397.06, 402, 403; 345/1.1; 414/10, 414/11, 12, 425, 754, 756, 763, 764, 766, 414/768, 769, 770, 773, 774, 775, 776, 414/778, 779, 780, 781, 783
See application file for complete search history.

(56) References Cited

U.S. PATENT DOCUMENTS

| | | | | |
|---|---|---|---|---|
| 1,115,021 A | * | 10/1914 | Pummill | ............. G09F 15/0062 40/610 |
| 2,168,205 A | * | 8/1939 | Harten | ..................... C23G 3/00 294/67.3 |

(Continued)

*Primary Examiner* — Gregory W Adams
(74) *Attorney, Agent, or Firm* — Brooks Kushman P.C.

(57) ABSTRACT

The present disclosure discloses a display panel turnover device. The display panel turnover device includes: a holder comprising two inverted-V shaped supports arranged oppositely and a rotating shaft pivotally assembled on top ends of the two inverted-V shaped supports, wherein each inverted-V shaped support comprises a front leg and a rear leg; an adjustment lever having a first operating position and a second operating position, located between two front legs and two rear legs and substantially parallel to the rotating shaft; a frame configured to retain a periphery of a display panel therein, wherein a top of the frame is secured to the rotating shaft, and a bottom of the frame is secured to the adjustment lever; and a front door and a rear door respectively arranged at a front side and a rear side of the frame and capable of being opened and closed.

17 Claims, 3 Drawing Sheets

(56) References Cited

U.S. PATENT DOCUMENTS

| | | | | |
|---|---|---|---|---|
| 4,220,239 A * | 9/1980 | Prichard, Jr. | ............ | B65H 29/00 |
| | | | | 198/403 |
| 6,540,472 B2 * | 4/2003 | Ewaschuk | .............. | B23Q 7/005 |
| | | | | 414/759 |
| 7,004,717 B2 * | 2/2006 | Marincic | ............... | B41C 1/1075 |
| | | | | 101/477 |
| 7,074,005 B2 * | 7/2006 | Nozawa | ................ | B41C 1/1083 |
| | | | | 414/758 |
| 8,317,454 B1 * | 11/2012 | Parker | .................... | B28D 7/043 |
| | | | | 414/770 |
| 2013/0050060 A1 * | 2/2013 | Ranger | .................... | G09F 9/35 |
| | | | | 345/1.1 |
| 2015/0146349 A1 * | 5/2015 | Choi | .................... | G06F 1/1641 |
| | | | | 361/679.01 |
| 2017/0132960 A1 * | 5/2017 | Kis-Benedek Pinero | ................... | |
| | | | | G09F 21/04 |

* cited by examiner

DISPLAY PANEL TURNOVER DEVICE AND METHOD FOR USING THE SAME

CROSS-REFERENCE TO RELATED APPLICATION

The application claims priority to Chinese patent application No. 201610741865.2 filed on Aug. 26, 2016, the disclosure of which is incorporated by reference herein in its entirety.

TECHNICAL FIELD

The disclosure relates to a field of display techniques, and in particular to a display panel turnover device and a method for using the same.

BACKGROUND

In a manufacturing process of a display panel (e.g., a liquid crystal panel), a side, having an array substrate, of the liquid crystal panel generally needs to be detected and analyzed, or a defect of the array substrate needs to be repaired, etc. Generally, the liquid crystal panel is placed with a side having a color filter substrate facing upward, and thus the liquid crystal panel needs to be turned over, such that the side having the array substrate faces upward. For a liquid crystal panel with a small size, it may be turned over manually by an operator; while for a liquid crystal panel with a relatively larger size, it is generally turned over by utilizing a turnover machine. In a turnover machine in a related art, a liquid crystal panel can be absorbed and held on a turnover-adsorption platform supported by a power source. The liquid crystal panel with a side having a color filter substrate facing upward is turned over by 180 degrees using the turnover-adsorption platform, such that a side, having an array substrate, of the liquid crystal panel faces upward.

However, it is inefficient to turn the liquid crystal panel over by utilizing the turnover machine. Furthermore, power such as electricity and vacuum adsorption is required for the turnover machine to implement the adsorption function. As such, if a problem occurs in the power source, it is difficult to ensure operational reliability of the turnover machine. In addition, the turnover machine needs to occupy larger space due to its larger size.

SUMMARY

The objective of the present disclosure is to provide a display panel turnover device and a method for using the same.

At least one embodiment of the present disclosure provides a display panel turnover device, including: a holder including two inverted-V shaped supports arranged oppositely and a rotating shaft pivotally mounted on top ends of the two inverted-V shaped supports, wherein each inverted-V shaped support includes one front leg and one rear leg; an adjustment lever having a first operating position and a second operating position, located between two front legs and two rear legs of the two inverted-V shaped supports and substantially parallel to the rotating shaft, wherein the adjustment lever is rotatable about the rotating shaft, a distance between the adjustment lever and each of the two front legs is less than a distance between the adjustment lever and each of the two rear legs when the adjustment lever is held at the first operating position, and a distance between the adjustment lever and each of the two front legs is greater than a distance between the adjustment lever and each of the two rear legs when the adjustment lever is held at the second operating position; a frame configured to hold a periphery of a display panel, wherein a top of the frame is secured to the rotating shaft, and a bottom of the frame is secured to the adjustment lever; and a front door and a rear door respectively arranged at a front side and a rear side of the frame and capable of being opened and closed.

Optionally, the adjustment lever in a state of being held at the first operating position is secured to the two front legs and the adjustment lever in a state of being held at the second operating position is secured to the two rear legs.

Optionally, first hooks are arranged on both of the two front legs and configured to secure the adjustment lever to the two front legs, and second hooks are arranged on both of the two rear legs and configured to secure the adjustment lever to the two rear legs.

Optionally, the adjustment lever is made of iron, first magnets are arranged on the two front legs and configured to attract the adjustment lever to the two front legs, and second magnets are arranged on the two rear legs of and configured to attract the adjustment lever to the two rear legs.

Optionally, bottoms at a front side and rear side of the frame are respectively provided with a display panel fixing stop block by which the periphery of a display panel is retained within the frame.

Optionally, a guide rail is arranged between the front leg and the rear leg of each inverted-V shaped support, and the adjustment lever is slidable assembled on the guide rail.

Optionally, a stopper is arranged between the front leg and the rear leg of each inverted-V shaped support, configured to hold the adjustment lever at a position on the guide rail corresponding to the first operating position, and configured to hold the adjustment lever at a position on the guide rail corresponding to the second operating position.

Optionally, bottoms at a front side and rear side of the frame are each provided with a display panel fixing stop block by which the periphery of a display panel is retained in the frame.

Optionally, each of the front door and the rear door is a double door.

Optionally, each of the front door and the rear door is a single door.

Optionally, a surface at a side of each of the front door and the rear door facing the display panel is provided with a flexible support pad.

Optionally, the flexible support pad has a structure of suction cup.

Optionally, the flexible support pad is made of rubber or damping silicone.

Optionally, one end of the adjustment lever is provided with an operating handle, so as to adjust a position of the adjustment lever.

Optionally, one end of the adjustment lever is provided with an operating handle, so as to adjust a position of the adjustment lever.

Optionally, when the adjustment lever is held at the first operating position, an angle between the frame and a vertical direction approximately ranges from 25° to 45°; and when the adjustment lever is held at the second operating position, an angle between the frame and a vertical direction approximately ranges from 25° to 35°.

Optionally, an angle between the front leg and the rear leg of each inverted-V shaped support approximately ranges from 58° to 62°.

At least one embodiment of the present disclosure further provides a method for using a display panel turnover device, wherein the method is applied to the display panel turnover device according to claim 1, and the method includes: holding the adjustment lever to the first operating position; opening the front door and closing the rear door; placing a display panel inside the frame to retain the periphery of the display panel in the frame, wherein a back side of the display panel leans against the rear door; closing the front door; moving the adjustment lever from the first operating position to the second operating position, and holding the adjustment lever at the second operating position; opening the rear door, wherein a front side of the display panel leans against the front door.

Optionally, the back side of the display panel has an array substrate, and the front side of the display panel has a color filter substrate.

DETAILED DESCRIPTION

In order to make the objectives, the technical solutions and the advantages of embodiments of the present disclosure clearer, the technical solutions of the embodiments of the present disclosure will be described clearly and fully hereinafter in conjunction with the drawings of the embodiments of the present disclosure. Obviously, the described embodiments are merely a part of, rather than all of, the embodiments of the present disclosure. Based on the described embodiments of the present disclosure, a person skilled in the art may obtain all other embodiments, which fall within the scope of the present disclosure.

Words such as "front", "rear", "up", "down", "left", "right" as used in the specification and the claims of the present disclosure are merely used to represent a relative positional relationship, and when an absolute position of an described object changes, the relative positional relationship may change accordingly.

Figure 1:
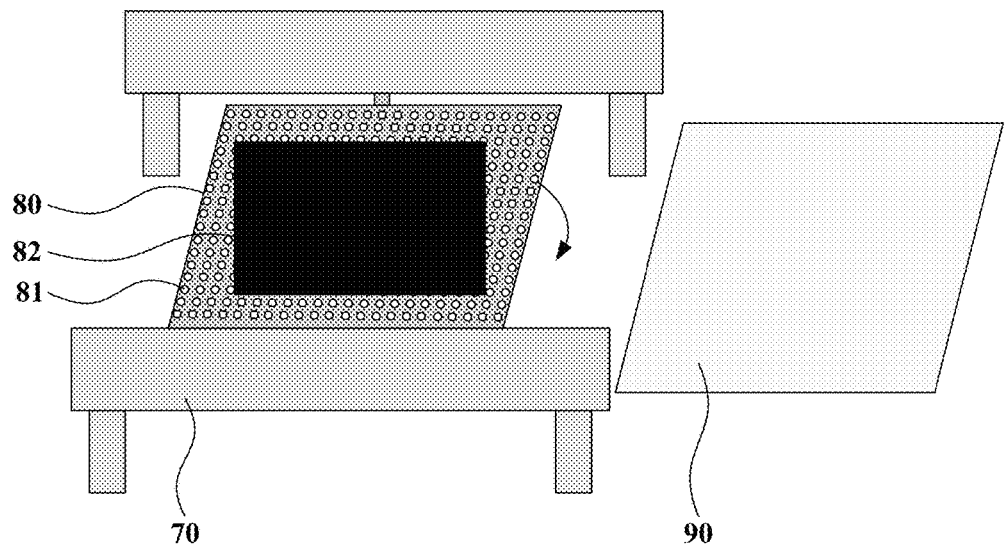
FIG. 1 is a schematic view of a structure of a turnover machine in a related art.

A turnover machine in the related art is schematically shown in FIG. 1. The turnover machine as shown in FIG. 1 includes a holder 70, a turnover-adsorption platform 80 pivotally assembled on the holder 70, and a bearing table 90, wherein a surface of the turnover-adsorption platform 80 is provided with vacuum adsorption holes 81. When in use, a liquid crystal panel 82 with a side having a color filter substrate facing upward is firstly placed on the turnover-adsorption platform 80 and an adsorption function of the turnover-adsorption platform 80 is initiated; then the turnover-adsorption platform 80 is turned over by 180°; and then the bearing table 90 is moved below the turnover-adsorption platform 80 and the adsorption function of the turnover-adsorption platform 80 is closed, such that the liquid crystal panel 82 is received by the bearing table 90, thereby completing turnover. It is inefficient to turn the liquid crystal panel over by 180° using the turnover machine in the related art. Furthermore, power such as electricity and vacuum adsorption is required for the turnover machine to implement the adsorption function. If a problem occurs in a power source, it is difficult to ensure the operational reliability of the turnover machine. In addition, the turnover machine generally has a larger size, which needs to occupy larger space.

To improve efficiency of turnover of a display panel, and to improve operational reliability of turnover of the display panel, at least one embodiment of the present disclosure provides a display panel turnover device.

For ease of understanding, the present disclosure is further described in detail below by way of embodiments.

As shown in FIG. 2 to FIG. 6, a display panel turnover device provided by at least one embodiment of the present disclosure, includes:

a holder 10, including two inverted-V shaped supports 11 arranged oppositely, and a rotating shaft 12 pivotally assembled on top ends of the two inverted-V shaped supports 11, wherein each inverted-V shaped support includes a front leg and a rear leg;

an adjustment lever 20 having a first operating position and a second operating position, located between two front legs and two rear legs of the two inverted-V shaped supports 11 and parallel to the rotating shaft 12, wherein the adjustment lever 20 can be rotated about the rotating shaft 12;

a frame 30 configured to retained a periphery of a display panel 60 therein, with a top being held to the rotating shaft 12 and a bottom being held to the adjustment lever 20;

a front door 40 and a rear door 50, respectively arranged at a front side and a rear side of the frame 30 and capable of being opened and closed respectively.

When the adjustment lever is held at the first operating position, a distance between the adjustment lever and each of the two front legs is less than a distance between the adjustment lever and each of the two rear legs of the two inverted-V shaped supports, and when the adjustment lever is held at the second operating position, a distance between the adjustment lever and each of the two front legs of the inverted-V shaped supports is greater than a distance between the adjustment lever and each of the two rear legs of the inverted-V shaped supports. Optionally, the adjustment lever has a first operating position where the adjustment lever is held to the two front legs of the two inverted-V shaped supports, and a second operating position where the adjustment lever is held to the two rear legs of the two inverted-V shaped supports.

In an embodiment, a guide rail is arranged between the front leg and the rear leg of each inverted-V shaped support, wherein the adjustment lever is slidable assembled on the guide rail, such that the adjustment lever is moved from the first operating position to the second operating position, or moved from the second operating position to the first operating position.

In an embodiment, a stopper is arranged between the front leg and the rear leg of each inverted-V shaped support, configured to hold the adjustment lever at a position on the guide rail corresponding to the first operating position and configured to hold the adjustment lever at a position on the guide rail corresponding to the second operating position.

In an embodiment, when the adjustment lever is held at the first operating position, an angle between the frame and a vertical direction approximately ranges from 25° to 45°; and when the adjustment lever is held at the second operating position, an angle between the frame and a vertical direction approximately ranges from 25° to 35°.

In the display panel turnover device provided by at least one embodiment of the present disclosure, when the adjustment lever 20 is located at the first operating position, the front door 40 is opened and the rear door 50 is closed, and the display panel 60 is placed inside the frame 30, such that a front side of the display panel 60 faces an operator, and a back side leans against the rear door 50 to avoid the display panel falling down; and then the front door 40 is closed and the adjustment lever 20 is moved to the second operating position. The operator can move from one side of the display panel turnover device to the other side, opens the rear door 50, and takes away the display panel 60 of which the back side faces the operator and the front side leans against the front door. When the adjustment lever 20 is moved between the first operating position and the second operating position, the front door 40 and the rear door 50 are always closed, so as to firmly secure the display panel 60 inside the frame 30. By changing the operating position of the adjustment lever 20, the side of the display panel 60 facing the operator is changed from the front side to the rear side, and thus the turnover of the display panel 60 is realized by the display panel turnover device. Compared to the related art, such a technical solution improves efficiency of turnover of the display panel and improves the operational reliability of turnover of the display panel.

The manner for retaining the front door 40 and the rear door 50 at the closed state is not limited. For example, the front door 40 and the rear door 50 may be locked at the front side and the rear side of the frame 30 by means of latches, respectively; or the front door 40 and the rear door 50 may be retained in the frame 30 by means of fasteners. For ease of moving the adjustment lever 20 by the operator, one end of the adjustment lever 20 is provided with an operating handle 21.

While the display panel turnover device is used to turn the liquid crystal panel over, when the adjustment lever is located at the first operating position, a side, having a color filter substrate, of the liquid crystal panel faces an operator; and when the adjustment lever is moved to the second operating position, a side, having an array substrate, of the liquid crystal panel faces the operator, and thus the turnover of the liquid crystal panel is completed, thereby further performing operations on the side, having the array substrate, of the liquid crystal panel, such as performing detection and analysis with a microscope, or performing laser repairing on a defect of the array substrate. Additionally, since the display panel turnover device has a symmetric structure with the rotating shaft as a symmetric axis, the front and the rear legs of the inverted-V shaped support may be defined by the operator according to working habits, so as to determine the first operating position and the second operating position of the adjustment lever.

Figure 3:
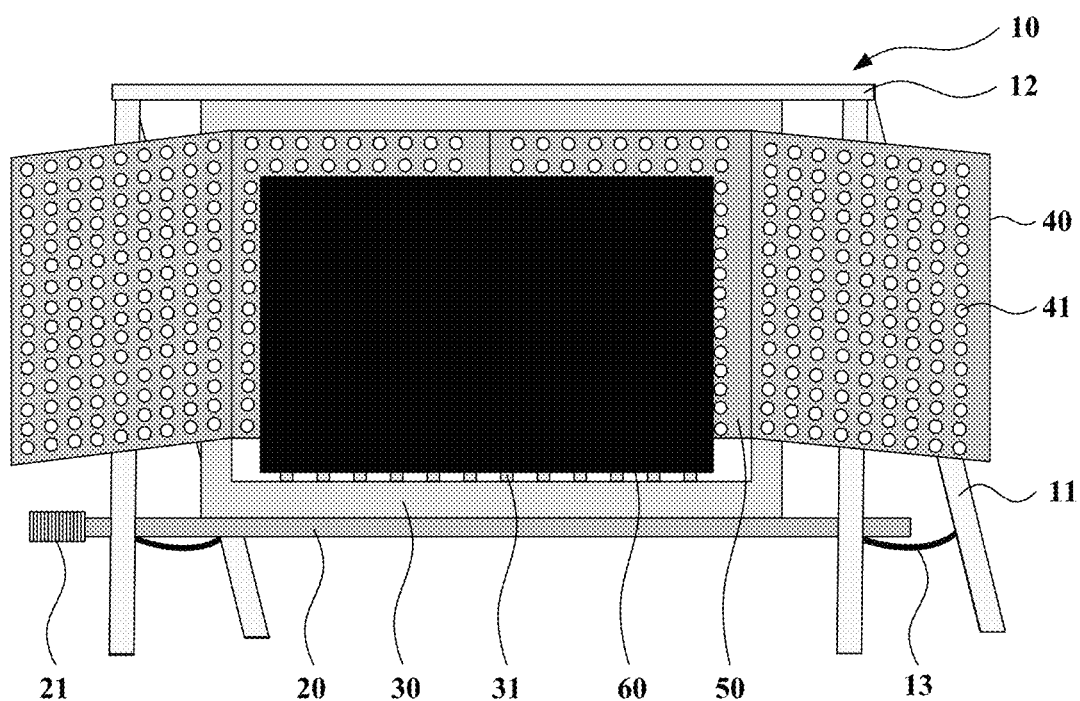
FIG. 3 is a schematic view of a structure of a display panel turnover device in use of at least one embodiment of the present disclosure.

As shown in FIG. 3, in an embodiment of the present disclosure, bottoms at a front side and a rear side of the frame 30 are respectively provided with a display panel fixing stop block 31. By means of the display panel fixing stop blocks 31, the display panel can be secured inside the frame 30 more firmly, thereby further improving operational reliability of turnover of the display panel. The number of the display panel fixing stop blocks 31 is not limited, and a plurality of display panel-fixing stop blocks may be arranged along a bottom edge of the frame 20 to improve effect of supporting the display panel.

Figure 2:
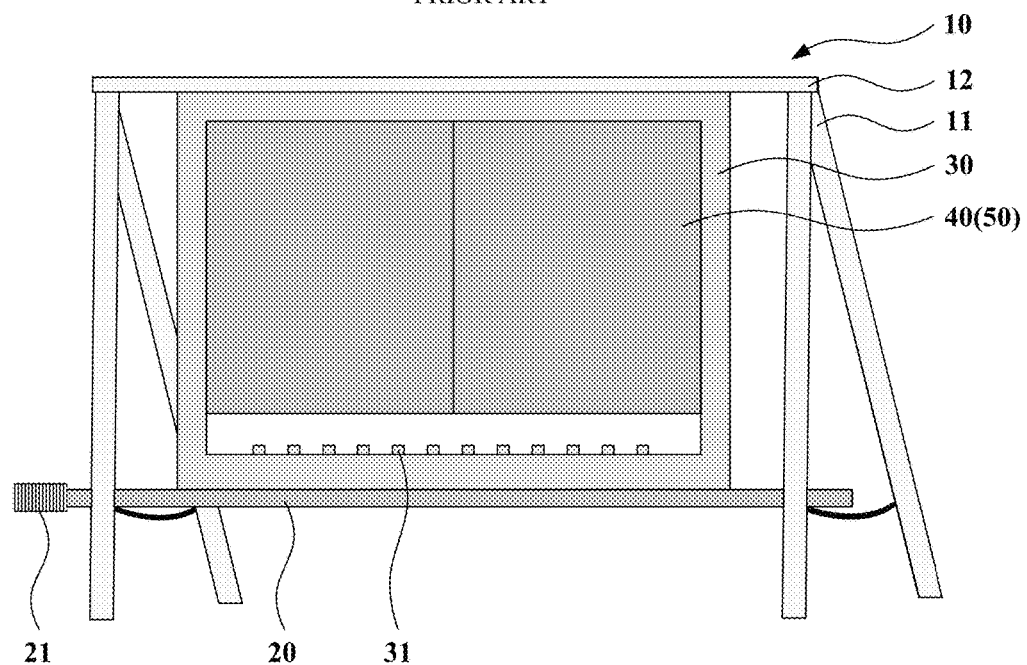
FIG. 2 is a schematic view of a structure of a display panel turnover device of at least one embodiment of the present disclosure.

As shown in FIG. 2, in an embodiment of the present disclosure, a guide rail 13 is arranged between the front leg and the rear leg of the inverted-V shaped support, and the adjustment lever 20 is slidable assembled on the guide rail 13. By arranging the guide rail 13, the adjustment lever can be moved smoothly and reliably between the first operating position and the second operating position, to avoid damage of the display panel due to an impact occurring when the adjustment lever 20 is approaching the first operating position and the second operation position, thereby further improving operational reliability of turnover of the display panel. The manner in which the adjustment lever 20 is slidable assembled on the guide rail 13 is not limited. For example, a sliding protrusion may be arranged on the guide rail 13, and a guide protrusion may be arranged at a position where the adjustment lever 20 is opposite to the sliding groove, to avoid the adjustment lever slipping off from the guide rail.

The specific forms of the front door and the rear door are not limited. As shown in FIG. 3, in an embodiment of the present disclosure, each of the front door 40 and the rear door 50 is a double door; in another embodiment of the present disclosure, each of the front door and the rear door is a single door.

The specific manner in which the adjustment lever is secured to the front leg and the rear leg of the inverted-V shaped support is not limited. In an embodiment of the present disclosure, a first hook is arranged on the front leg of the inverted-V shaped support and configured to hold the adjustment lever at the first operating position, and a second hook is arranged on the rear leg of the inverted-V shaped support and configured to hold the adjustment lever at the second operating position. By utilizing this technical solution, the adjustment lever can be firmly secured to the front legs and the rear legs of the two inverted-V shaped supports by means of the first hook and the second hook.

In another embodiment of the present disclosure, the adjustment lever is made of iron, a first magnet is arranged on the front leg of the inverted-V shaped support and configured to attract the adjustment lever at the first operating position, and a second magnet is arranged on the rear leg of the inverted-V shaped support and configured to attract the adjustment lever at the second operating position. By utilizing this technical solution, the adjustment lever can be securely attracted to the front leg and the rear leg of the inverted-V shaped support by means of the first magnet and the second magnet.

Figure 4:
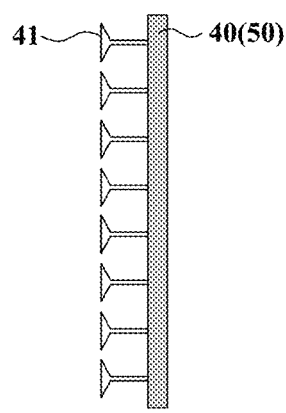
FIG. 4 is a schematic side view of a structure of a front (rear) door of at least one embodiment of the present disclosure.
Figure 5:
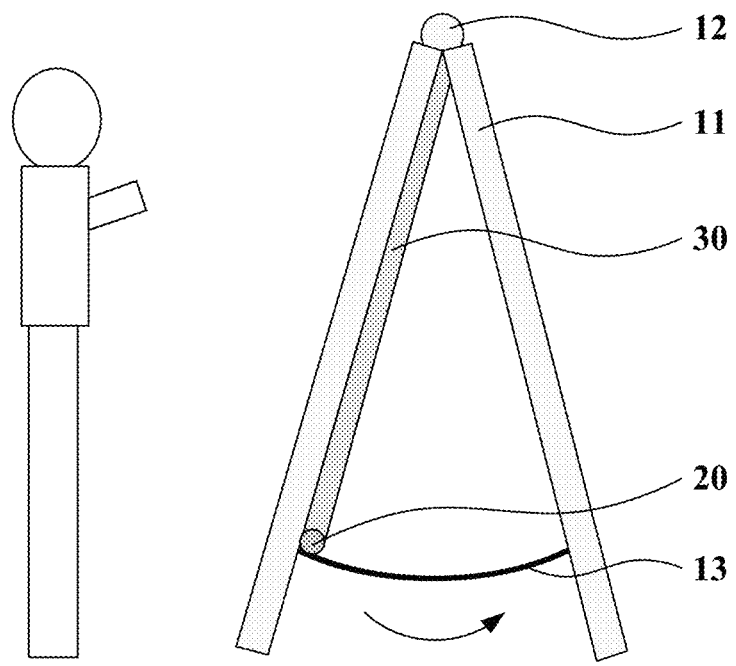
FIG. 5 is a schematic view of a structure of a display panel turnover device when an adjustment lever is held at a first operating position, of at least one embodiment of the present disclosure.
Figure 6:
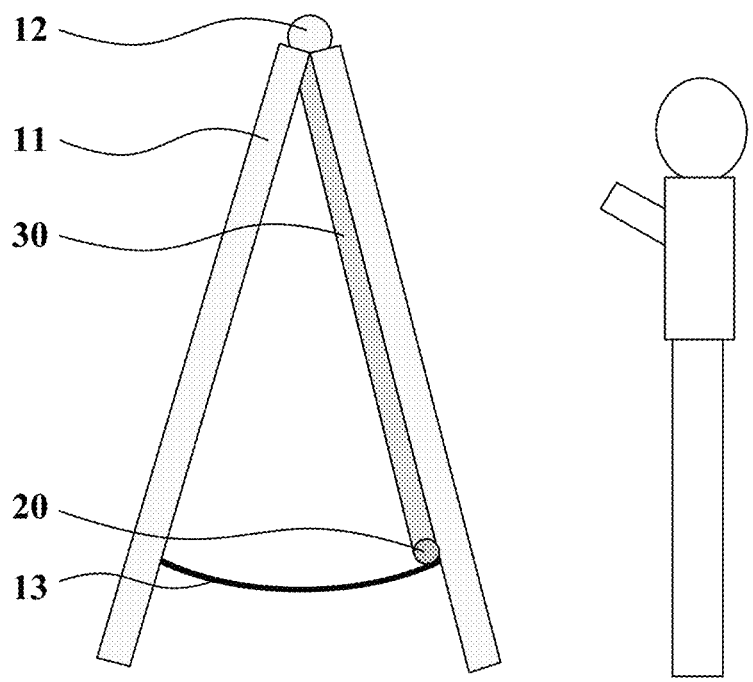
FIG. 6 is a schematic view of a structure of a display panel turnover device when an adjustment lever is held at a second operating position, of at least one embodiment of the present disclosure.

As shown in FIGS. 3 and 4, in an embodiment of the present embodiment, surfaces at sides, faces the display panel 60, of the front door 40 and the rear door 50 are respectively provided with several flexible support pads 41. By utilizing this technical solution, rigid contact between the display panel 60 and the front door 40 and the rear door 50 can be changed to flexible contact by means of the flexible support pads 41, thereby mitigating bruising and scratching of the display panel 60 by the front door 40 and the rear door 50. Furthermore, the flexible support pads 41 can further mitigate impacts caused to the display panel 60 due to movements of the adjustment lever 20, thereby further improving operational reliability of turnover of the display panel. The specific structure of the flexible support pads 41 is not limited. For example, they may have a structure of suction cup as shown in FIG. 4, such that the flexible support pads 41 have a certain adsorption function to the display panel 60, thereby improving effects of securing and supporting the display panel 60. The specific type of the flexible support pads 41 is not limited. For example, they may be rubber pads or damping silicone pads, etc.

In an embodiment of the present embodiment, an angle between the front leg and the rear leg of the inverted-V shaped support approximately ranges from 58° to 62°. That is, the angle is approximately 60°, with precision of ±2°. When the adjustment lever is held at the first operating position or the second operating position, the inverted-V shaped support with the above angle enables an operator to conveniently place the display panel inside the frame or take away the display panel from the inside of the frame, thereby improving operational convenience of the display panel turnover device. Furthermore, compared to the related art in which the turnover machine needs to turn the turnover-adsorption platform over by 180°, this technical solution only needs to turn the frame over by the above angle, thereby significantly reducing the footprint of the display panel turnover device.

Apparently, for a person skilled in the art, various modifications and variations may be made to the present disclosure without departing from the spirit and scope of the present disclosure. As such, if these modifications and variations of the present disclosure fall within the scope of the claims of the present disclosure and equivalent techniques thereof, the present disclosure is intended to include these modifications and variations.

What is claimed is:

1. A display panel turnover device, comprising:
   a holder comprising two inverted-V shaped supports arranged opposite to each other and a rotating shaft pivotally assembled on top ends of the two inverted-V shaped supports, wherein each inverted-V shaped support comprises one front leg and one rear leg;
   an adjustment lever having a first operating position and a second operating position, located between two front legs and two rear legs of the two inverted-V shaped supports and substantially parallel to the rotating shaft, wherein the adjustment lever is rotatable about the rotating shaft, a distance between the adjustment lever and each of the two front legs is less than a distance between the adjustment lever and each of the two rear legs in the case that the adjustment lever is held at the first operating position, and a distance between the adjustment lever and each of the two front legs is greater than a distance between the adjustment lever and each of the two rear legs in the case that the adjustment lever is held at the second operating position;
   a frame configured to retain a periphery of a display panel therein, wherein a top of the frame is secured to the rotating shaft, and a bottom of the frame is secured to the adjustment lever; and
   a front door and a rear door respectively arranged at a front side and a rear side of the frame and capable of being opened and closed.

2. The display panel turnover device according to claim 1, wherein the adjustment lever in a state of being held at the first operating position is secured to the two front legs and the adjustment lever in a state of being held at the second operating position is secured to the two rear legs.

3. The display panel turnover device according to claim 2, wherein first hooks are arranged on both of the two front legs and configured to secure the adjustment lever to the two front legs, and second hooks are arranged on both of the two rear legs and configured to secure the adjustment lever to the two rear legs.

4. The display panel turnover device according to claim 2, wherein the adjustment lever is made of iron, first magnets are arranged on the two front legs and configured to attract the adjustment lever to the two front legs, and second magnets are arranged on the two rear legs and configured to attract the adjustment lever to the two rear legs.

5. The display panel turnover device according to claim 1, wherein a guide rail is arranged between the front leg and the rear leg of each inverted-V shaped support, and the adjustment lever is slidably assembled on the guide rail.

6. The display panel turnover device according to claim 5, wherein a stopper is arranged between the front leg and the rear leg of each inverted-V shaped support, configured to hold the adjustment lever at a position on the guide rail corresponding to the first operating position, and configured to hold the adjustment lever at a position on the guide rail corresponding to the second operating position.

7. The display panel turnover device according to claim 1, wherein bottoms at a front side and rear side of the frame are each provided with a display panel fixing stop block by which the periphery of a display panel is retained in the frame.

8. The display panel turnover device according to claim 1, wherein each of the front door and the rear door is a double door.

9. The display panel turnover device according to claim 1, wherein each of the front door and the rear door is a single door.

10. The display panel turnover device according to claim 1, wherein a surface of each of the front door and the rear door facing the display panel is provided with a flexible support pad.

11. The display panel turnover device according to claim 10, wherein the flexible support pad has a structure of suction cup.

12. The display panel turnover device according to claim 10, wherein the flexible support pad is made of rubber or damping silicone.

13. The display panel turnover device according to claim 1, wherein one end of the adjustment lever is provided with an operating handle, so as to adjust a position of the adjustment lever.

14. The display panel turnover device according to claim 1, wherein, in the case that the adjustment lever is held at the first operating position, an angle between the frame and a vertical direction approximately ranges from 25° to 45°; and in the case that the adjustment lever is held at the second operating position, an angle between the frame and a vertical direction approximately ranges from 25° to 35°.

15. The display panel turnover device according to claim 1, wherein an angle between the front leg and the rear leg of each inverted-V shaped support approximately ranges from 58° to 62°.

16. A method for using the display panel turnover device according to claim 1, comprising:
   holding the adjustment lever to the first operating position;
   opening the front door and closing the rear door;
   placing a display panel inside the frame to retain the periphery of the display panel in the frame, wherein a back side of the display panel leans against the rear door;
   closing the front door;

moving the adjustment lever from the first operating position to the second operating position, and holding the adjustment lever at the second operating position; and opening the rear door, wherein a front side of the display panel leans against the front door.

17. The method according to claim 16, wherein the display panel has an array substrate at the back side and a color filter substrate at the front side.

* * * * *